United States Patent
Skripin et al.

(10) Patent No.: US 6,954,501 B2
(45) Date of Patent: Oct. 11, 2005

(54) METHOD AND APPARATUS FOR OBJECT BASED MOTION COMPENSATION

(75) Inventors: Dmitry Skripin, St. Petersburg (RU); Andrey Marsavin, St. Petersburg (RU); Irina Bocharova, St. Petersburg (RU); Ilya Asnis, San Jose, CA (US); Andrei Morozov, Mountain View, CA (US)

(73) Assignee: XVD Corporation, Fremont, CA (US)

(*) Notice: Subject to any disclaimer, the term of this patent is extended or adjusted under 35 U.S.C. 154(b) by 282 days.

(21) Appl. No.: 10/368,094

(22) Filed: Feb. 17, 2003

(65) Prior Publication Data

US 2004/0161037 A1 Aug. 19, 2004

(51) Int. Cl.[7] .......................... H04N 7/12; H04N 11/02
(52) U.S. Cl. .................................................. 375/240.16
(58) Field of Search ................................. 348/419, 400, 348/405, 384; 375/240.15, 240.24, 240.12, 240.09, 240.08, 240.17

(56) References Cited

U.S. PATENT DOCUMENTS

| | | | |
|---|---|---|---|
| 5,442,458 A | 8/1995 | Rabbani et al. | |
| 5,572,258 A | 11/1996 | Yokoyama | |
| 5,650,783 A | 7/1997 | Murashita et al. | |
| 5,654,702 A | 8/1997 | Ran | |
| 5,686,956 A | 11/1997 | Oh et al. | |
| 5,764,374 A | 6/1998 | Seroussi et al. | |
| 5,812,198 A | 9/1998 | Saigusa et al. | |
| 5,818,531 A | 10/1998 | Yamaguchi et al. | |
| 6,008,852 A | 12/1999 | Nakaya | |
| 6,023,296 A * | 2/2000 | Lee et al. | 348/405 |
| 6,084,912 A | 7/2000 | Reitmeier et al. | |
| 6,178,202 B1 | 1/2001 | Nakaya | |
| 6,208,761 B1 | 3/2001 | Passaggio et al. | |
| 6,256,346 B1 | 7/2001 | Yamaguchi et al. | |
| 6,263,109 B1 | 7/2001 | Ordentlich et al. | |
| 6,310,920 B1 * | 10/2001 | Ogawa | 375/240.17 |
| 6,442,205 B1 | 8/2002 | Nakaya | |
| 6,483,877 B2 | 11/2002 | Nakaya | |
| 6,614,847 B1 * | 9/2003 | Das et al. | 375/240.16 |
| 6,700,934 B2 * | 3/2004 | Lin | 375/240.16 |
| 2004/0022322 A1 * | 2/2004 | Dye | 375/240.26 |

FOREIGN PATENT DOCUMENTS

| WO | PCT/US2004/004383 | 4/2004 |
|---|---|---|
| WO | PCT/US04/04383 | 2/2005 |

* cited by examiner

Primary Examiner—Vu Le
Assistant Examiner—Behrooz Senfi
(74) Attorney, Agent, or Firm—Blakely, Sokoloff, Taylor & Zafman LLP

(57) ABSTRACT

A method and apparatus for object based motion compensation forms objects from blocks of an input image based on motion similarity of the blocks in the input image and a reference image. In addition, object motion compensation vectors for each formed object and object relative block motion compensation vectors for each object's constituent blocks relative to the object's motion compensation vector are computed.

14 Claims, 10 Drawing Sheets

SEARCH AREA
501

OBJECT MAP
502

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG. 5A 502    503

| 1 | 1 | 1 | 0 | 0 | 0 |
|---|---|---|---|---|---|
| 0 | 0 | 0 | 1 | 1 | 1 |
| 1 | 1 | 1 | 0 | 0 | 0 |
| 1 | 1 | 1 | 1 | 1 | 1 |
| 1 | 1 | 1 | 1 | 1 | 1 |

| 1 | 1 | 1 | 2 | 2 | 2 |
|---|---|---|---|---|---|
| 3 | 3 | 3 | 1 | 1 | 1 |
| 1 | 1 | 1 | 3 | 3 | 3 |
| 1 | 1 | 1 | 1 | 1 | 1 |
| 1 | 1 | 1 | 1 | 1 | 1 |

METHOD AND APPARATUS FOR OBJECT BASED MOTION COMPENSATION

BACKGROUND OF THE INVENTION

1. Field of the Invention

The invention relates to the field of video compression. More specifically, the invention relates to object based motion compensation.

2. Background of the Invention

A video signal contains image repetition redundancies that are not essential to its apparent quality. Removal of these redundancies in the video signal significantly lowers the number of bits required to synthesize the video signal. Usually, a motion compensation technique is used to remove these redundancies. A motion compensated prediction method is applied to the current and a previous or a future image (frame) to generate motion vectors. Motion vectors represent the difference in position between the current frame, or a part of current frame, and the displaced reference frame, or a part of the reference frame.

Different methods are used to perform motion compensation. One motion compensation method computes motion compensation vectors for each of the fixed size blocks comprising an image. In this case, the motion compensation vector represents the difference in position between the block from the current frame and the displaced block from the reference frame.

Motion compensation is also performed based on objects of an image. Objects are formed from an image based on current frame information (for example, luminance and/or color changes). Objects are also formed based on wavelet filtering without taking into account object movements. These methods for motion compensation are inefficient because neither method accounts for movement.

Many convention motion compensation methods have a limited search range for finding object and block displacements. Moreover, search complexity grows substantially as the search range increases.

BRIEF SUMMARY OF THE INVENTION

A method and apparatus for object based motion compensation is described. According to one aspect of the invention, a method comprises forming objects from blocks of an input image based on motion similarity, and computing motions vectors for each formed object and for each block within each object relative to the object's motion vector.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIG. 5A is a diagram illustrating an object map and search area according to one economy of invention.

FIG. 5B is a conceptual diagram illustrating reduction of the search area according to one of embodiment of the invention.

FIG. 5C is a diagram of an exemplary final object map according to one embodiment of the invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1:
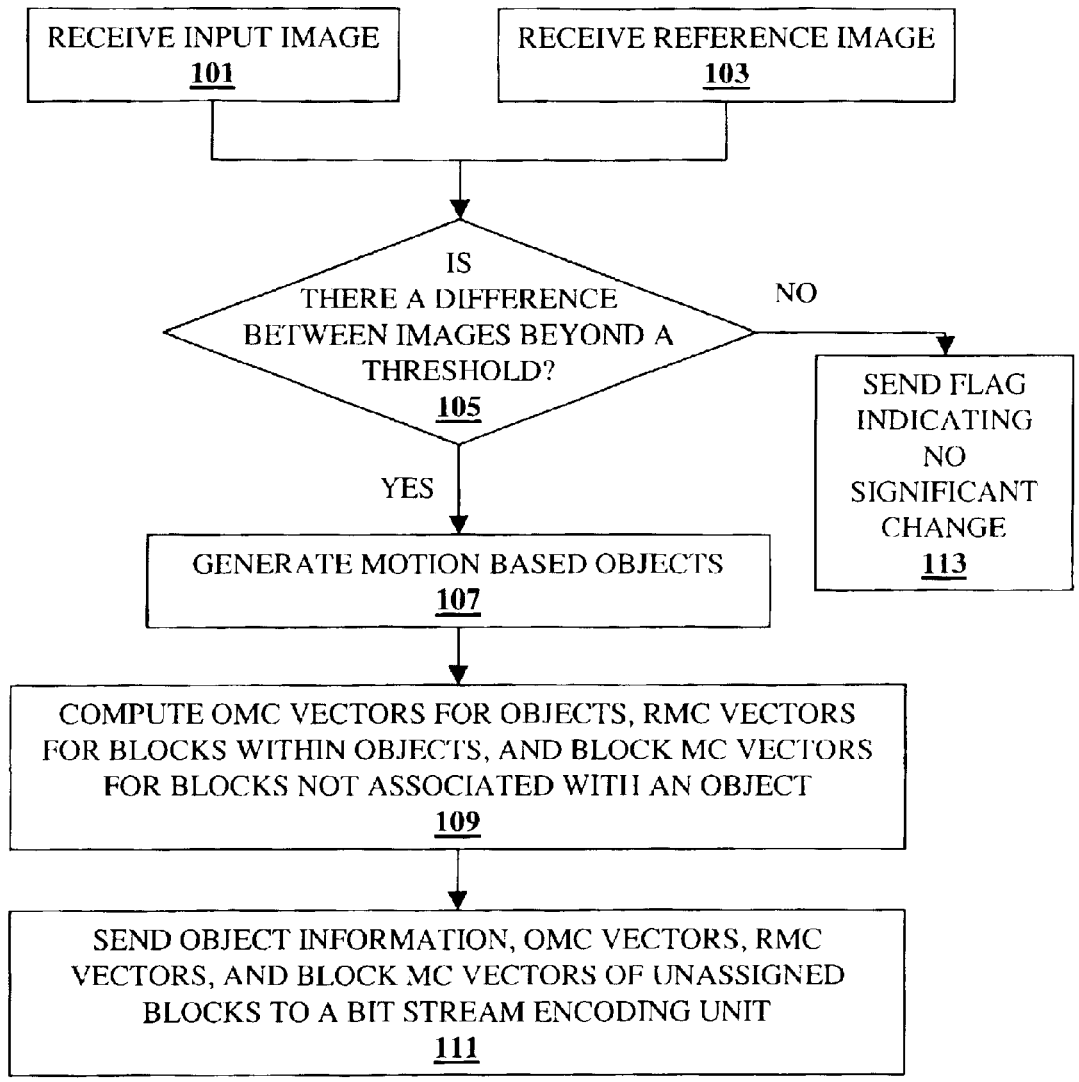
FIG. 1 is a flowchart for object based motion compensation according to one embodiment of the invention.

FIG. 1 is a flowchart for object based motion compensation according to one embodiment of the invention. At block 101, an input image is received. At block 103, a reference image is received. Alternatively, the reference image may be accessed from a local memory instead of received. At block 105, it is determined if there is a difference between the received images beyond a certain threshold. If the difference is below a certain threshold, then control flows to block 113. If there is a difference beyond the threshold, then control flows to block 107.

At block 113, a flag indicating lack of a significant change between received images is sent. In an alternative embodiment of invention, motion compensation vectors of 0 are sent for individual blocks of the input image. In another embodiment of the invention, a global motion compensation vector of (0, 0) is sent for the entire input image.

At block 107, motion based objects are generated. The block 109, motion compensation vectors for the generated objects and relative motion compensation vectors for blocks within the generated objects are computed. Individual block motion compensation vectors for blocks that have not been associated with an object are also computed at block 109. At block 111, object information, motion compensation vectors for objects (object motion compensation vectors), motion compensation vectors for blocks relative to their objects (object relative block motion compensation vectors), and individual block motion compensation vectors for unassociated blocks are sent to a bit stream encoding unit.

Forming objects from blocks based on similarity of motion enables use of object relative block motion compensation vectors. Using object relative block motion compensation vectors reduces the complexity of motion compensation information transmitted for a given image. Typically N motion compensation vectors are transmitted for an image with N blocks. With object based motion compensation, N object relative block motion compensation vectors and I objects motion compensation vectors are transmitted for a given image (i.e., N+I motion compensation vectors are transmitted). Although a greater number of motion compensation vectors are transmitted, the object relative block motion compensation vectors are less complex than typical block motion compensation vectors. In other words, a greater number of vectors are transmitted, but the overall number of bits required to represent these vectors are fewer than the number of bits required to represent typical block motion compensation vectors.

Figure 2A:
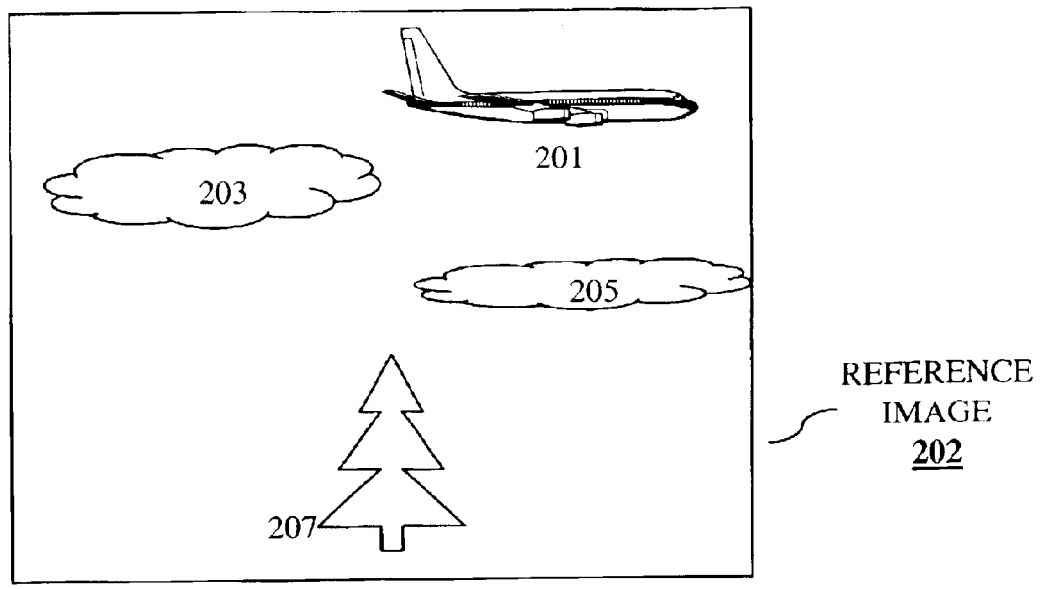
FIG. 2A is a diagram of an example reference image according to one by men invention.
Figure 2B:
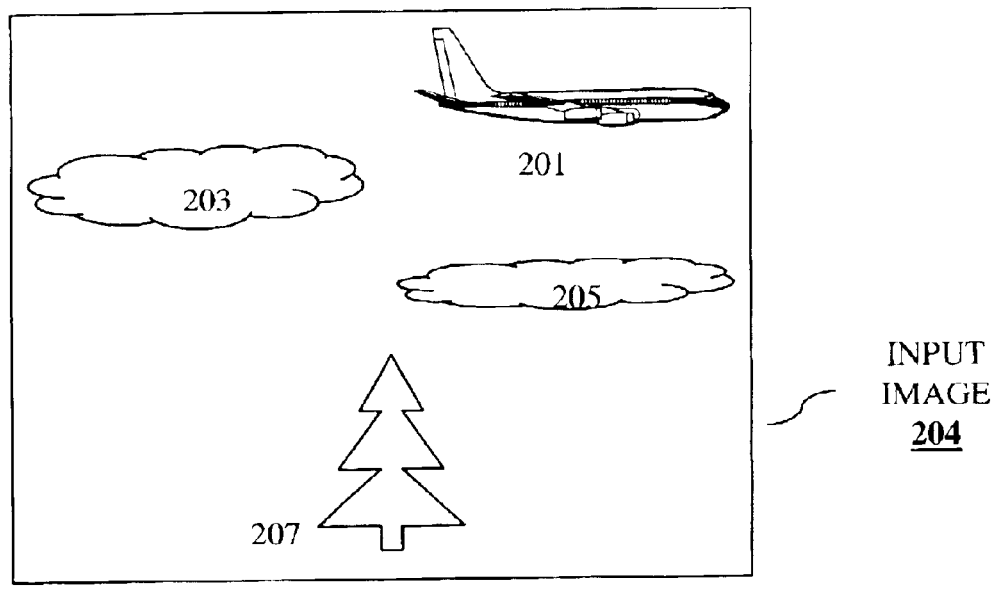
FIG. 2B is a diagram of an example input image according to one embodiment of invention.
Figure 2C:
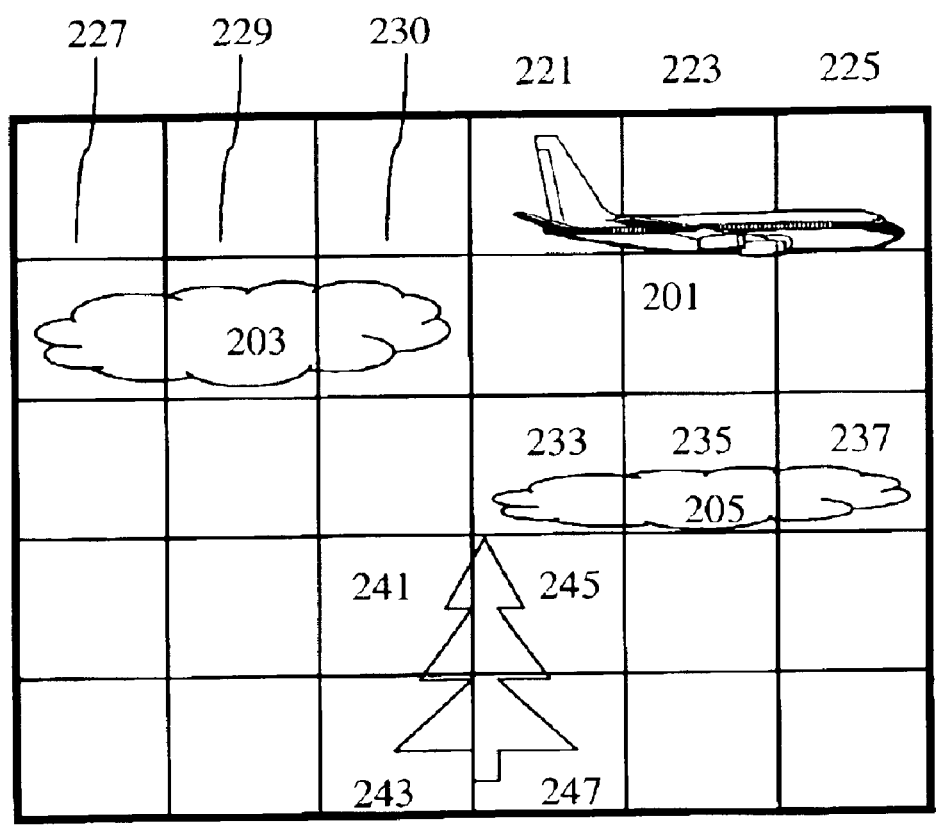
FIG. 2C is a diagram of the input image 204 of FIG. 2B illustrating the blocks of the input image 204 according to one embodiment of the invention.

FIGS. 2A–2C are diagrams illustrating example images according to one embodiment of the invention. FIG. 2A is a diagram of an example reference image according to one by men invention. In FIG. 2A, a reference image 202 includes a playing 201, the clouds 203 and 205, and the tree 207.

FIG. 2B is a diagram of an example input image according to one embodiment of invention. In FIG. 2B, an input image 204 includes the plane 201, the clouds 203 and 205, and the tree 207. The plane 201 of the input image 204 has moved up and right in relation to the reference image 202. Both of the clouds 203 and 205 of the input image 204 have moved left in relation to the reference image 202. The tree 207 of the input image 204 has not moved in relation to the reference image 202.

FIG. 2C is a diagram of the input image 204 of FIG. 2B illustrating the blocks of the input image 204 according to one embodiment of the invention. The scale of blocking illustrated in FIG. 2C is large in order to aid in understanding of invention. Contiguous blocks 221,223, and 225 include the plane 201 of the input image 204. Contiguous blocks 227,229, and 230 include the clouds 203 of the input image 204. The contiguous blocks 233,235,237 include the cloud 205 of a good image 204. The contiguous blocks 241,243, 245, and 247 include the tree 207 of the input image 204.

Figure 3A:
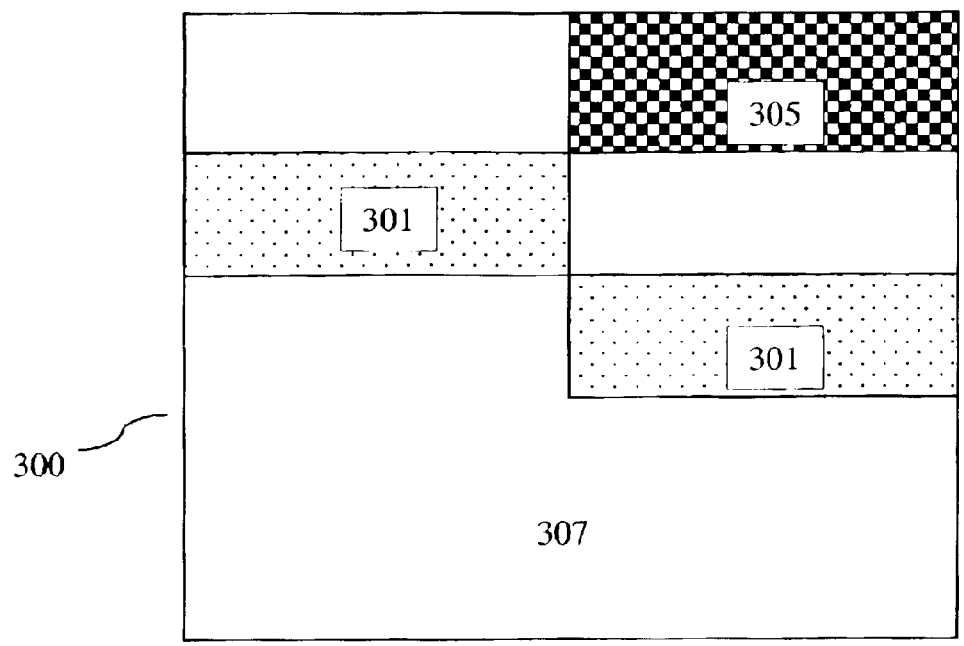
FIG. 3A is a conceptual diagrams illustrating motion based objects generated from the input image 204 of FIG. 2B according to one embodiment of invention.
Figure 3B:
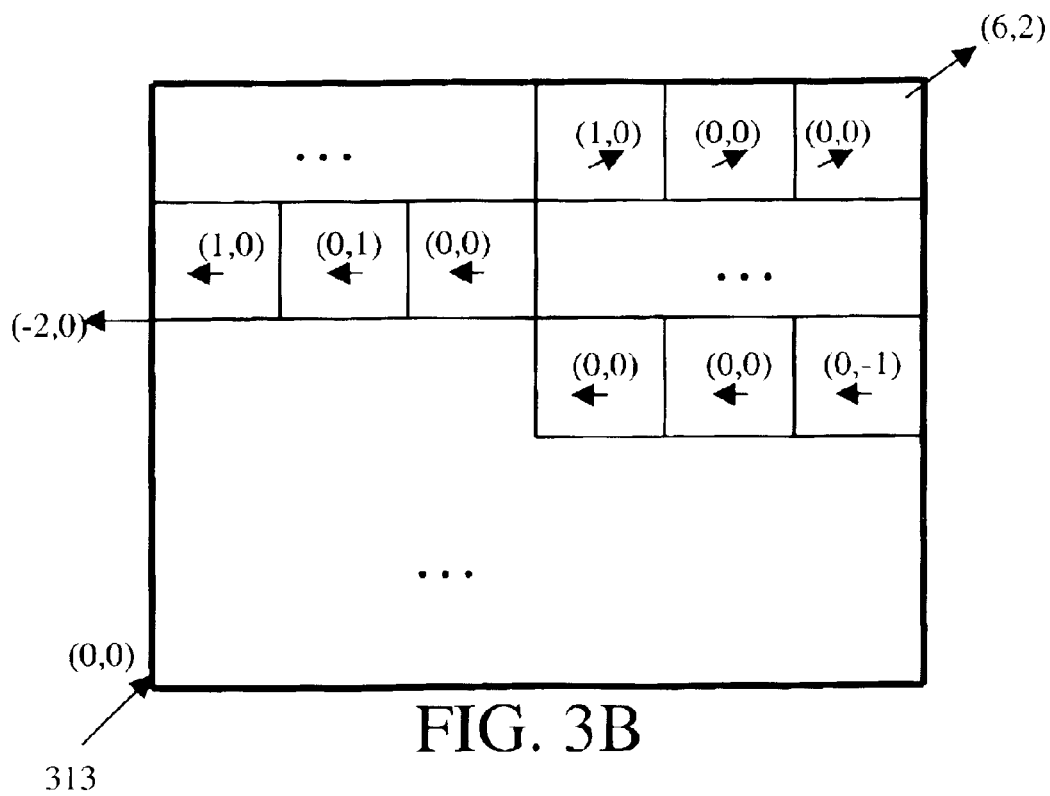
FIG. 3B is a conceptual diagram illustrating motion compensation vectors for the objects illustrated in FIG. 3A according to one embodiment of the invention.

FIGS. 3A–3B are conceptual diagrams illustrating processing of the input image 204 of FIG. 2B according to one embodiment of the invention. FIG. 3A is a conceptual diagram illustrating motion based objects generated from the input image 204 of FIG. 2B according to one embodiment of invention. An object diagram 300 for the input image 204 includes an object 305, an object 301, and an object 307. The object 305 corresponds to the contiguous blocks 221, 223, 225 that include the plane 201. The object 301 includes the blocks 227, 229, 230 and the blocks 233, 235, 237. As illustrated in FIG. 3A, the object 301 includes two noncontiguous groups of blocks. These noncontiguous groups of blocks are associated with the same object 301 because of their similar motion. Regardless of differences in color, luminance, etc. the clouds 203 and 205 are attributed to the same object 301 because of their similar motion. Generating objects based on similar motion increases search efficiency and typically reduces the number of objects of an image. All remaining blocks of the input image 204 are attributed to the object 307 (the background object).

FIG. 3B is a conceptual diagram illustrating motion compensation vectors for the objects illustrated in FIG. 3A according to one embodiment of the invention. The object 305 as an object motion compensation vector (6, 2). The object relative block motion compensation vectors for the object 305 are relatively simple values. The object relative block motion compensation vector for the block 221 is (1,0). The object relative block motion conversation vectors for the blocks 223 and 225 are (0, 0). These relatively small motion compensation vectors for blocks of the object 305 illustrate their substantially small movements with respect to the object 305. Although these movements are small with respect to the object 305, the typical block motion compensation vectors for these individual blocks would be relatively large.

The object 301 has an object motion compensation vector (−2,0). The constituent blocks 227, 229, 230, 233, 235, and 237 of the object 301 respectively have the following object relative block motion compensation vectors: (1,0), (0, 1), (0, 0), (0, 0), (0, 0), (0, −1). The object motion compensation vector for the background object 307 (i.e., the global motion compensation vector) is (0, 0).

Figure 4:
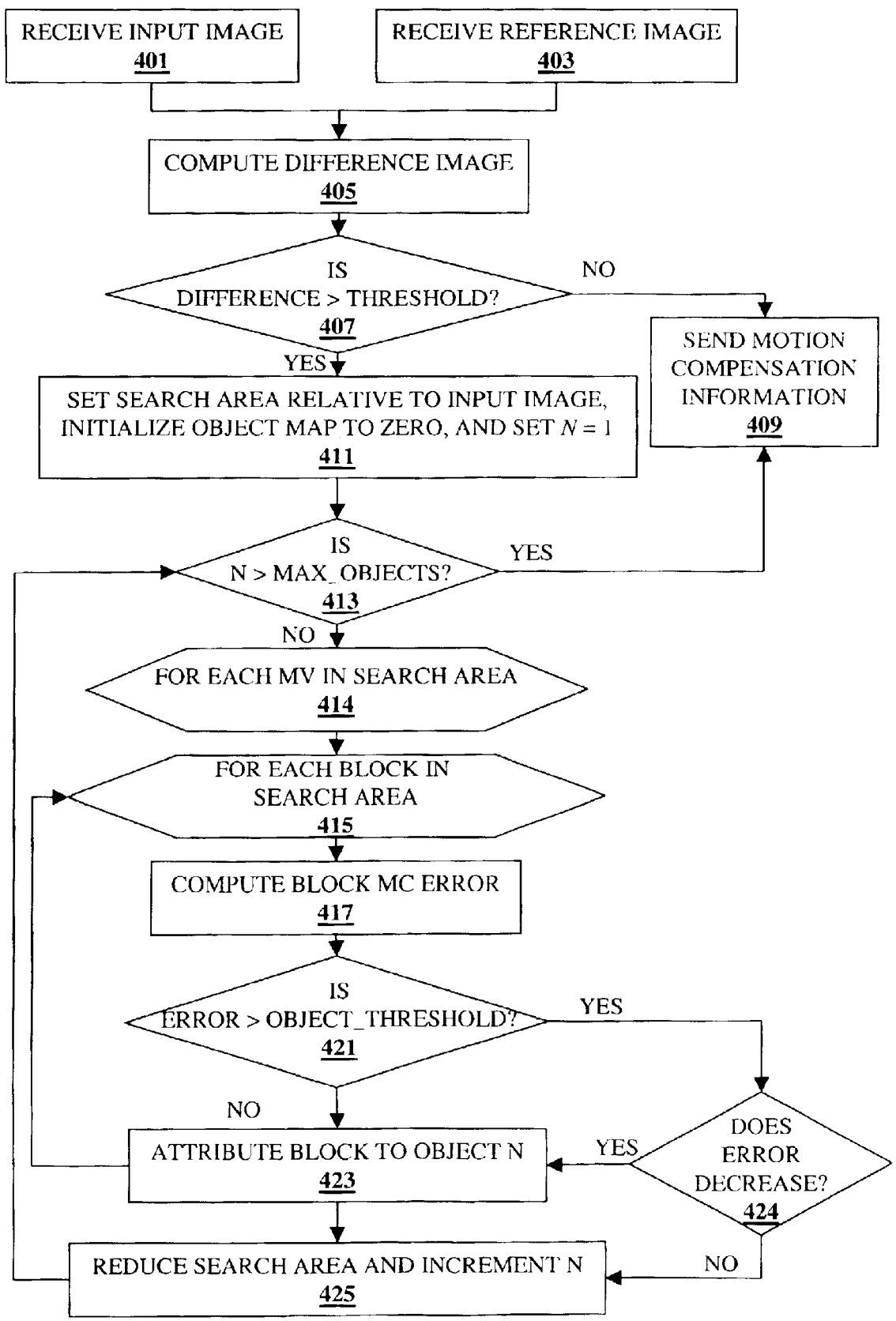
FIG. 4 is a flowchart for motion compensating input image generating an object map according to one embodiment of the invention.

FIG. 4 is a flowchart for motion compensating input image generating an object map according to one embodiment of the invention. FIGS. 5A–5C are conceptual diagrams illustrating processing of an object map according to one embodiment of invention. FIG. 4 will be described with reference to FIGS. 5A–5C. At block 401, an input image is received. At block 403, a reference image is received. At block 405, a difference image is computed. In one embodiment of the invention, the difference image is computed by subtracting a luminosity value for each pixel of the reference image from a luminosity value for each pixel of the input image. In another embodiment of the invention, a sum of absolute values of difference image pixels serves as a measure of difference between the input image in the reference image. At block 407, is determined if the difference between the input image in the reference image is greater than a threshold. Various embodiments of the invention may define the threshold from real world experiences, laboratory observations, mathematical computations, etc. If the difference exceeds the threshold, then control flows to block 409. If the difference does not exceed the threshold, then control flows to block 411.

At block 409, motion compensation information is sent a to bit stream encoding unit.

At block 411, a search area is set with respect to the entire input image and an object map is initialized with a zero matrix. In addition, N (representing the number of objects) is set to one.

FIG. 5A is a diagram illustrating an object map and search area according to one embodiment of invention. An object map 502 is a matrix corresponding to blocks of the input image. Each block has been initialized to a value of zero. A value of zero indicates that the block has not been associated with an object. Alternative embodiments of the invention may utilize different values to initialize the object map 502. A dotted line 501 surrounding the object map 502 indicates the search area for the input image.

Referring to FIG. 4, at block 413, it is determined if N is greater than MAX_OBJECTS (a predefined maximum number of objects to be processed). If N is greater than MAX_OBJECTS, then control flows to block 409. If N is not greater than MAX_OBJECTS, then control flows to block 414.

At block 414, a loop begins for all object motion compensation vectors within search area.

At block 415, a loop begins for each block within the search area. At block 417, at block motion compensation error is computed. In one embodiment of the invention, the motion compensation error is computed as a sum of absolute values of luminosity differences between pixel of current frame and respective pixel of the reference frame. At block 421, is determined if the computed block motion compensation error exceeds OBJECT_THRESHOLD. If the block motion compensation error exceeds OBJECT_THRESHOLD, then control flows to block 424. At the block motion compensation error does not exceed OBJECT_THRESHOLD, then control flows to block 423.

At block 424, it is determined if the block motion compensation error decreases with respect to [0,0] motion compensation vector. If the block motion compensation error decreases, then control flows to block 423. If the block motion compensation error does not decrease, then control flows to block 425.

At block 423, the block is attributed to object N. Control loops back from block 423 to block 415. At block 425, the search area is reduced in relation to the blocks that have not been pictured it to an object. Control loops back from block 425 to block 413.

FIG. 5B is a conceptual diagram illustrating reduction of the search area according to one of embodiment of the invention. Each element of the object map 502 pictured it to the background object 307 has been set to one. In addition, a dotted line 503 indicates reduction of the search area to the remaining blocks that have not been attributed to an object.

FIG. 5C is a diagram of an exemplary final object map according to one embodiment of the invention. As already described, elements of the object map 502 corresponding to blocks attributed to the background object 307 have been set to one. Elements of the object map 502 corresponding to blocks attributed to the object 305 have been set to two. Elements of the object map 502 corresponding to blocks attributed to the object 301 have been set to three.

Figure 6:
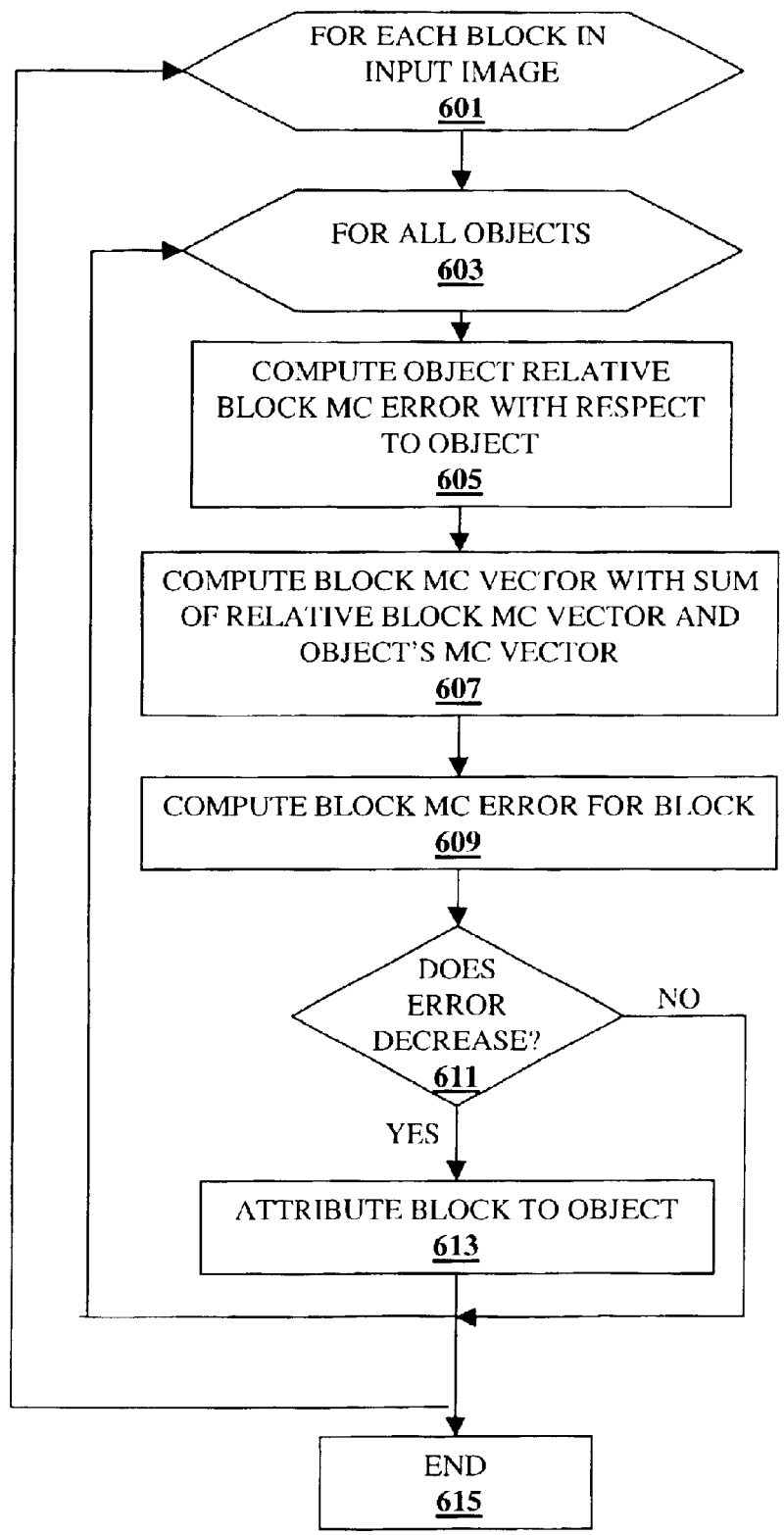
FIG. 6 is a flowchart for object reassignment according to one embodiment of the invention.

FIG. 6 is a flowchart for object reassignment according to one embodiment of the invention. At block 601, loop control is begun for each block in the input image. At block 603, nested loop control is begun for all objects of the input image. At block 605, an object relative block motion compensation vector is computed with respect to the current object. At block 607, a block motion compensation vector is computed with a sum of the computed object relative block motion compensation vector and the current object motion compensation vector. At block 609, block motion compensation error is computed for the current block as a sum of absolute values of luminosity differences between pixel of current frame and respective pixel of the reference frame for all pixels in the current block. At block 611, it is determined if the block motion compensation error decreases. If the block motion compensation error decreases, then control flows to block 613. If the block motion compensation error does not decrease, then block 613 is skipped. At block 613, the block is attributed to the current object. After block 613, control flows in accordance with the loops. If the loops have completed, then control flows to block 615 where the processing ends.

In one embodiment of the invention, the operations described in FIG. 6 are performed after the operations described in FIG. 4. In another embodiment of the invention, the operations performed in FIG. 6 are performed after a objects are formed with a technique different than the technique described above.

Figure 7:
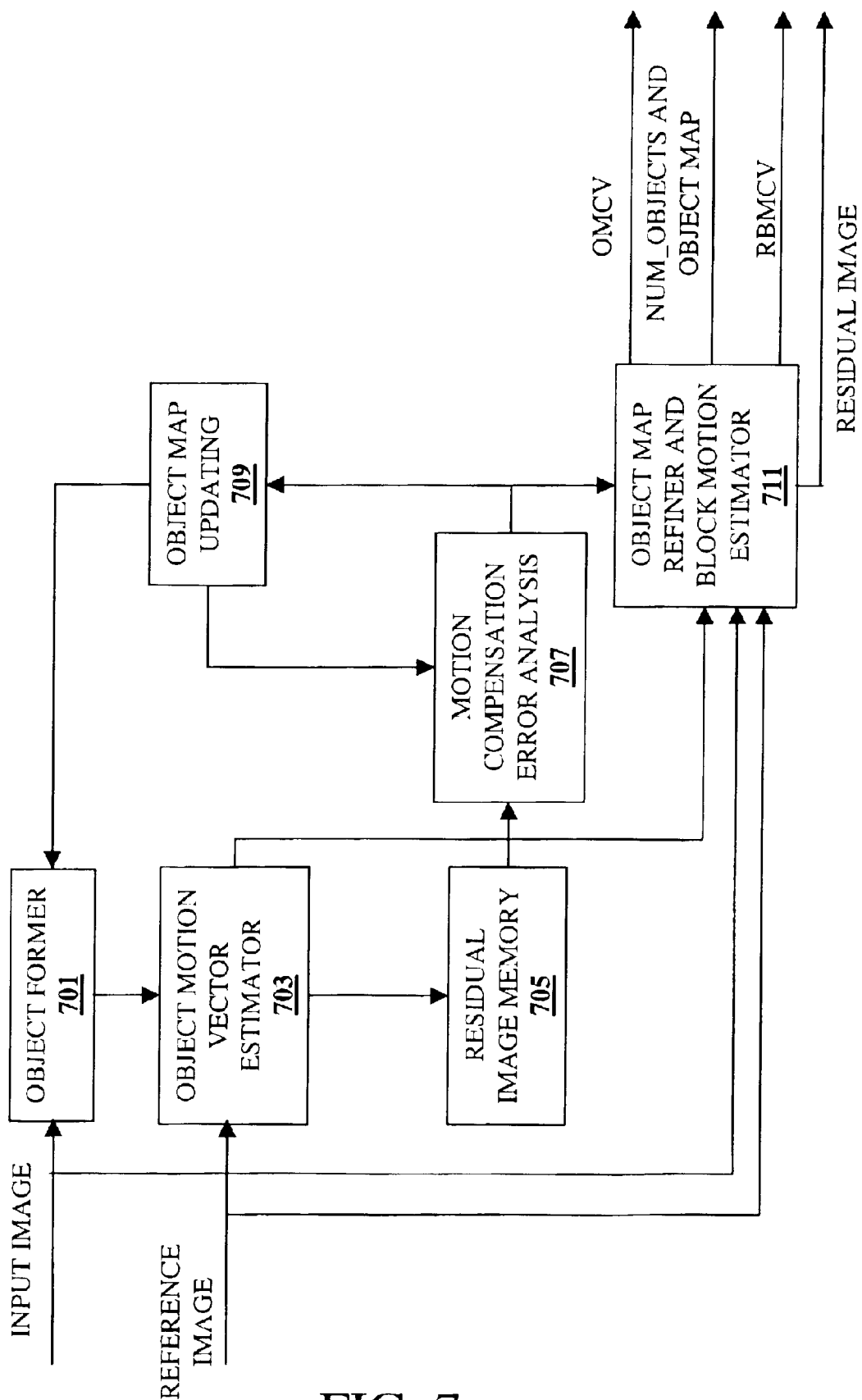
FIG. 7 to block diagram of an object based motion compensator according to one embodiment invention.

FIG. 7 to block diagram of an object based motion compensator according to one embodiment invention. In FIG. 7, an input image flows into an object former 701, where all blocks previously assigned to objects are excluded from the area of interest. A reference image flows into an object motion vector estimator 703. The object former 701 sends an object map to the object motion vector estimator 703. The object motion estimator generates a from the reference image and the object map. The residual image is stored in a residual image memory 705. The object motion vector estimator 703 sends motion vector for the object to an object map refiner and block motion estimator 711. The object map refiner and block motion estimator 711 refines the object map and provides the refined object map, and block motion vectors to an object map updater 709. The object map updater 709 provides an updated object map to the object former 701 and to a motion compensation error analyzer 707. The motion compensation analyzer 707 uses the updated object map from the object map updater 709 and the residual image from the residual image memory to analyze motion compensation error. After the input image is processed, the object map refiner and block motion estimator 711 provides object motion compensation vectors, object relative block motion compensation vectors, the residual image, the number of object and the object map to the bit stream encoding unit.

Figure 8:
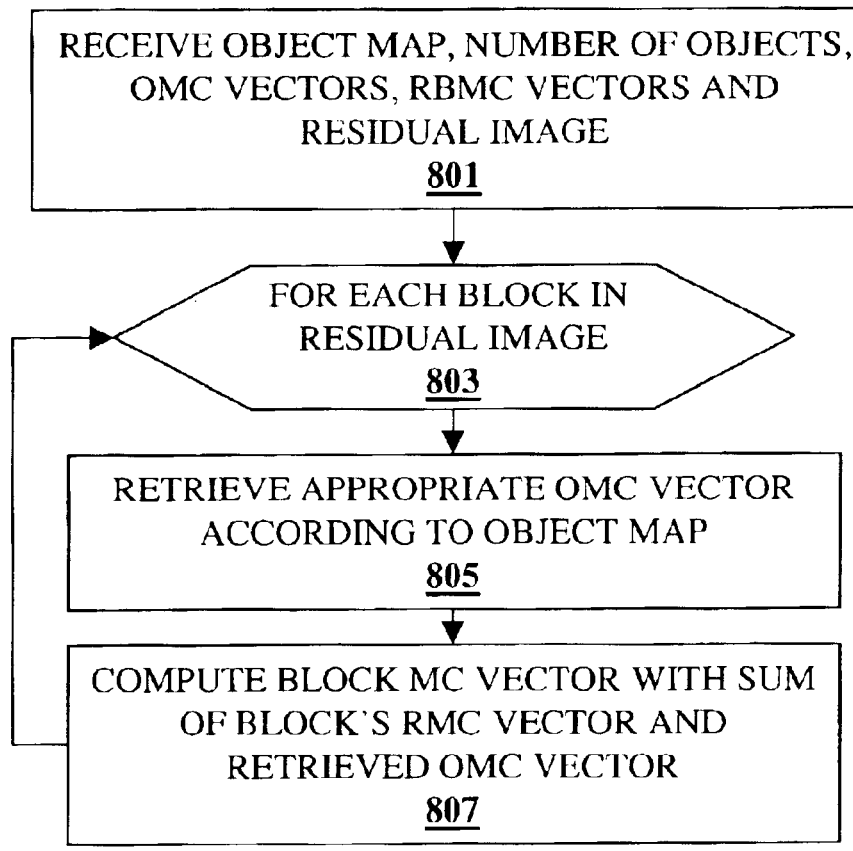
FIG. 8 is a flowchart for a video decoder to process object based motion compensation information according to one embodiment of the invention.

FIG. 8 is a flowchart for a video decoder to process object based motion compensation information according to one embodiment of the invention. At block 801, an object map, number of objects, object motion compensation vectors, object relative block motion compensation vectors, and a residual image is received. At block 803, loop control is begun for each block in the residual image. At block 805, inappropriate object motion compensation vector according to the object map is retrieved. At block 807, the current block's individual block motion compensation vector is computed with a sum of its object relative block motion compensation vector and the retrieved object motion compensation vector. Control flows from block 807 to block 803.

Figure 9:
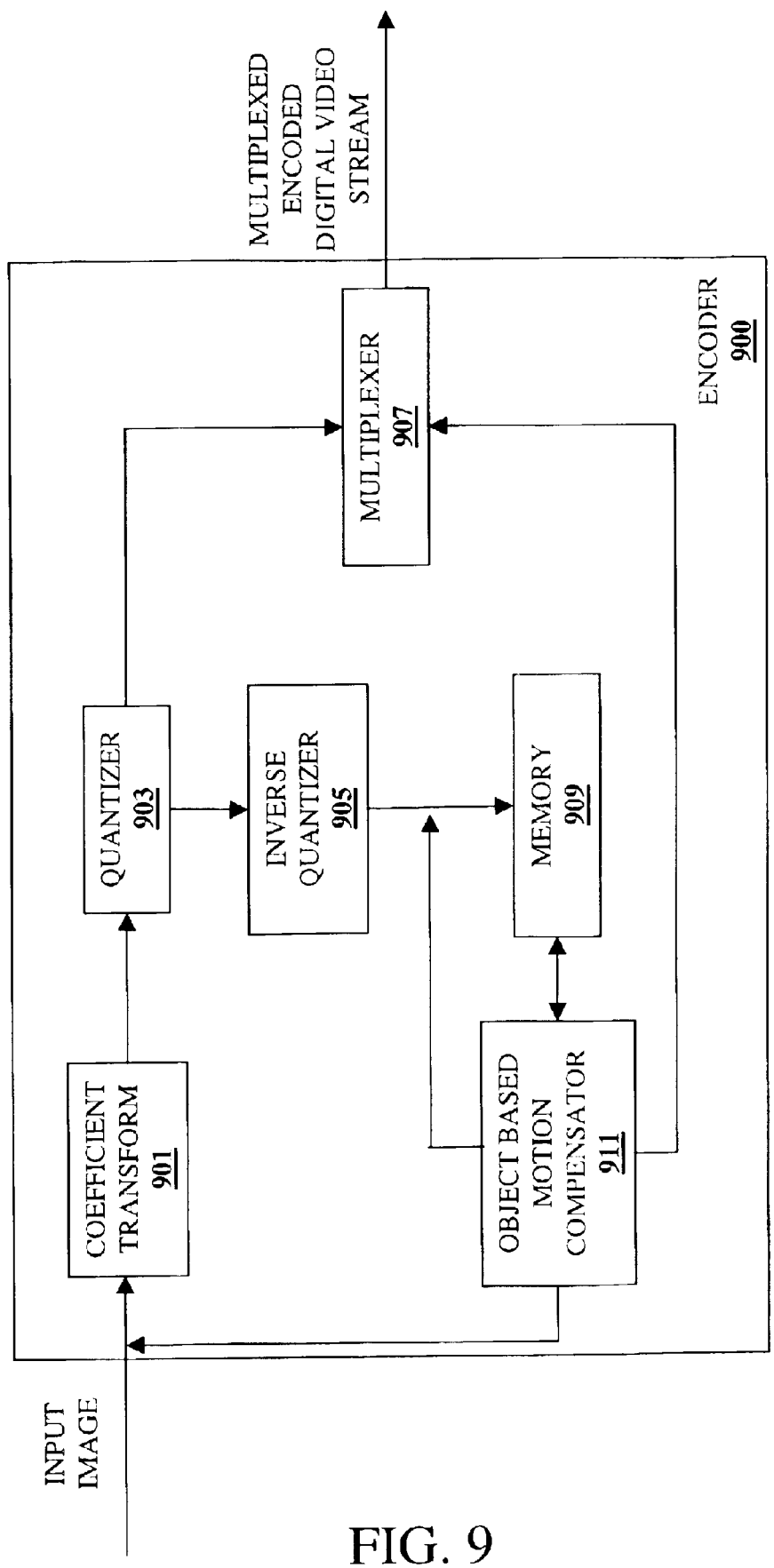
FIG. 9 is an exemplary diagram of an encoder according to one embodiment of the invention.

FIG. 9 is an exemplary diagram of an encoder according to one embodiment of the invention. An encoder 900 includes a coefficient transform 901, a quantizer 903, an inverse quantizer 905, a memory 909, an object based motion compensator 911, and a multiplexer 907. The coefficient transform 901 receives an input image and generates coefficients for the input image. The generated coefficients are sent to the quantizer 903. The quantizer 903 sends input image data to the inverse quantizer 905 and the multiplexer 907. The inverse quantizer 905 sends input image data to the memory 909. The object based motion compensator 911 uses input image data stored in the memory 909 to generate motion vectors and provides these motion vectors to the coefficient transform 901, the multiplexer 907, and stores them in the memory 909. The multiplexer 907 outputs a multiplexed encoded digital stream from the encoder 900.

The encoder described above includes memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Alternative Embodiments

While the invention has been described in terms of several embodiments, those skilled in the art will recognize that the invention is not limited to the embodiments described. For instance, while the flow diagrams show a particular order of operations performed by certain embodiments of the invention, it should be understood that such order is exemplary (e.g., alternative embodiments may perform the operations in a different order, combine certain operations, overlap certain operations, etc.). For example, with reference to FIG. 4, blocks 401 and 403 are performed sequentially in certain embodiments of the invention.

Thus, the method and apparatus of the invention can be practiced with modification and alteration within the spirit and scope of the appended claims. The description is thus to be regarded as illustrative instead of limiting on the invention.

We claim:

1. A method comprising:

receiving an input image and a reference image;

partitioning the input image into a plurality of unassigned blocks;

setting a search area for motion compensation based on the plurality of blocks;

defining a first object as those of the plurality of blocks with a motion compensation error within a given threshold relative to a motion compensation vector for the collective plurality of blocks;

reducing the search area for motion compensation based on a second plurality of blocks, which are those blocks of the first plurality that do not define the first object;

defining a second object with those of the second plurality of blocks with a second motion compensation error within the given threshold relative to a second motion compensation vector for the collection of second plurality of blocks; and sending object motion compensation vectors for the first and second objects and object relative block motion compensation vectors for the first and second object's constituent blocks.

2. The method of claim 1 further comprising:

computing a difference image from the reference and the input image;

determining whether the difference image exceeds a threshold; and if the difference image does not exceed the threshold, then sending a flag indicating that the difference image does not exceed the threshold.

3. The method of claim 1 wherein the sending is to a bit stream encoding unit.

4. The method of claim 1 further comprising determining individual block motion vectors by summing the objective relative motion compensation vectors and the object motion compensation vector.

5. The method of claim 1 further comprising:

generating an object map indicating which blocks belong to which objects; and sending the object map with the object map.

6. An apparatus comprising:

an object former unit to form objects;

an object motion vector estimator unit coupled with the object former;

an object map refiner and block motion estimator unit coupled with the object motion vector estimator unit;

an object map updating unit coupled with the object map refiner and block motion estimator unit and the object map former unit, the object map updating unit to update an object map and provide the updated object map to the object former unit and a motion compensation error analysis unit; and a motion compensation error analysis unit coupled with the object map updating unit and the object map refiner and block motion estimator unit.

7. The apparatus of claim 6 further comprising:

a residual image memory coupled with the object motion vector stimator unit and the object map refiner and block motion estimator unit, the residual image memory to store a residual image.

8. The apparatus of claim 6 further comprising:

a bit stream encoding unit coupled with the object map refiner and block motion estimator unit, the bit stream encoding unit to receive object information, object relative block motion compensation vectors and object motion compensation vectors.

9. The apparatus of claim 8 wherein the object information includes an object map and a number of objects.

10. A machine-readable medium having a set of instruction which when executed, cause the following operations to be performed:

receiving an input image and a reference image;

partitioning the input image into a plurality of unassigned blocks;

setting a search area for motion compensation based on the plurality of blocks;

defining a first object as those of the plurality of blocks with a motion compensation error within a given threshold relative to a motion compensation vector for the collective plurality of blocks;

reducing the search area for motion compensation based on a second plurality of blocks, which are these blocks of the first plurality that do not define the first object;

defining a second object with those of the second plurality of blocks with a second motion compensation error within the given threshold relative to a second motion compensation vector for the collection of second plurality of blocks, and sending object motion compensation vectors for the first and second onjects and object relative block motion comprensation vectors for the first and second object's constituent blocks.

11. The machine-readable medium of claim 10 further comprising:

computing a difference image from the reference and the input image;

determining whether the difference image exceeds a threshold; and if the difference image does not exceed the threshold, then sending a flag indicating that the difference image does not exceed the threshold.

12. The machine-readable medium of claim 10 wherein the sending is to a bit stream encoding unit.

13. The machine-readable medium of claim 10 further comprising determining individual block motion vectors by summing the objective relative motion compensation vectors and the object motion compensation vector.

14. The machine-readable medium of claim 10 further comprising:

generating an object map indicating which blocks belong to which objects; and sending the object map with the object map.

* * * * *